March 16, 1926.
M. B. JACKSON
LIQUID LEVEL INDICATOR
Filed Oct. 9, 1923
1,576,512
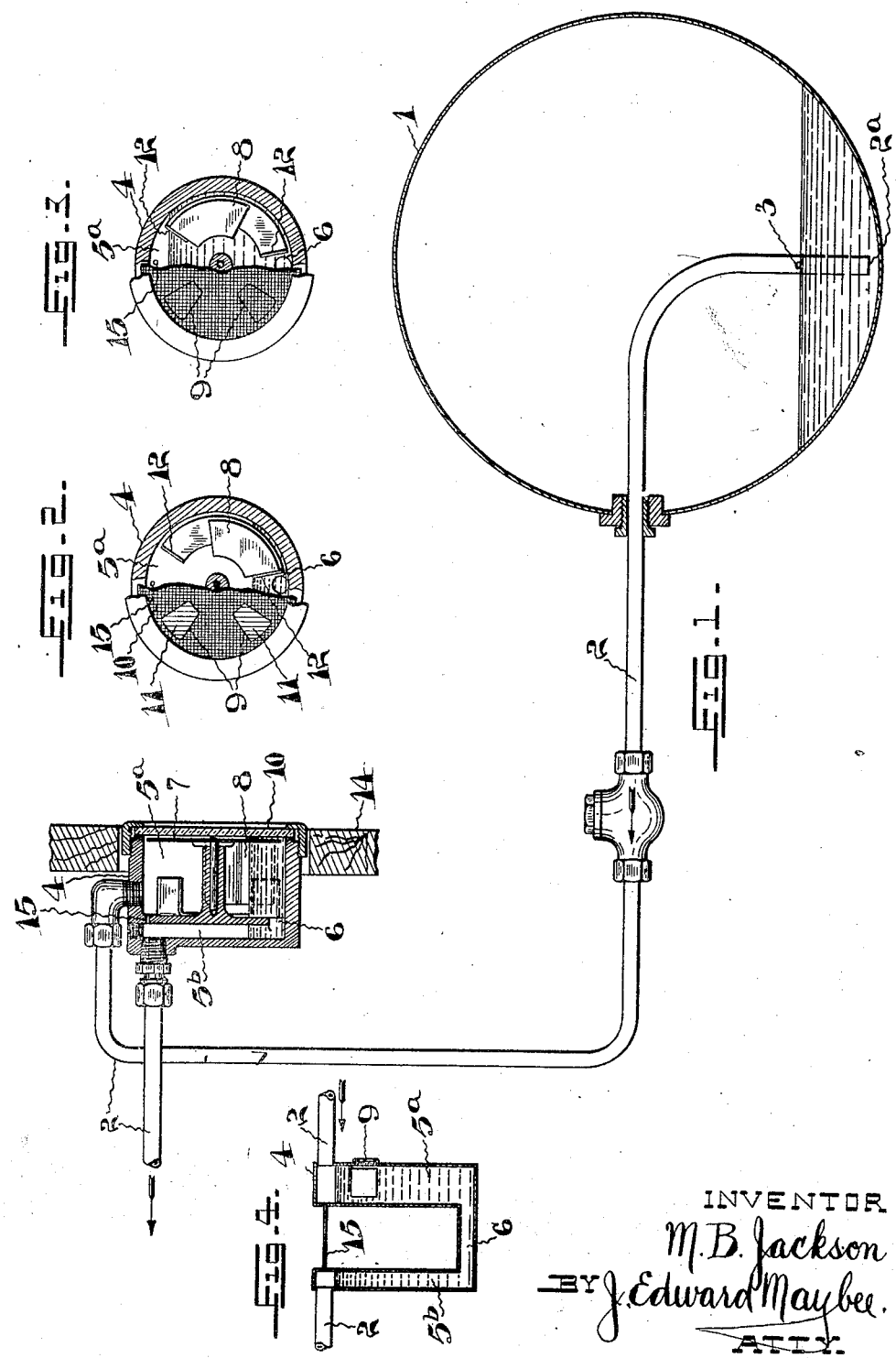
INVENTOR
M. B. Jackson
BY J. Edward Maybee.
ATTY.

Patented Mar. 16, 1926.

1,576,512

UNITED STATES PATENT OFFICE.

MAUNSELL B. JACKSON, OF TORONTO, ONTARIO, CANADA, ASSIGNOR TO HIMSELF, EDWARD McMAHON, AND THOMAS CAMERON BATE, BOTH OF OTTAWA, ONTARIO, CANADA, TRUSTEES.

LIQUID-LEVEL INDICATOR.

Application filed October 9, 1923. Serial No. 667,485.

*To all whom it may concern:*

Be it known that I, MAUNSELL BOWERS JACKSON, of the city of Toronto, in the county of York, Province of Ontario, Canada, a subject of the King of Great Britain, have invented certain new and useful Improvements in Liquid-Level Indicators, of which the following is a specification.

This invention relates to apparatus for indicating when the liquid level in a tank falls below a predetermined minimum and more particularly to apparatus of this type used in connection with a vacuum feed system for internal combustion engines and my object is to provide simple apparatus that may be manufactured cheaply and that may be readily installed in existing vacuum feed systems without danger of forming any air leaks therein.

I attain my object by means of the constructions hereinafter described and illustrated in the accompanying drawings in which—

Fig. 1 is a cross section of my indicator showing its connection with a vacuum feed system;

Fig. 2 a front elevation of the indicator partly broken away to show the interior thereof;

Fig. 3 a similar view to Fig. 2 showing the movable parts of the indicator in their normal position; and Fig. 4 a diagrammatical view of the indicator.

1 is a supply tank of a vacuum supply system commonly used in automobiles and well known in the art. The system also includes a supply pipe line 2 leading from the supply tank to a vacuum tank (not shown) which is connected with the intake pipe of an internal combustion engine and also with the carburettor thereof whereby the suction stroke of the engine creates a vacuum in the vacuum tank to draw the liquid from the supply tank thereto and the liquid is fed by means of gravity to the carburettor. One end of the supply pipe 2 communicates at 2ª with the supply tank 1 adjacent the bottom thereof and just above this communication the pipe is provided with an opening 3 adapted to permit air to be drawn into the pipe when the liquid level in the supply tank falls below the opening.

4 is an indicating device comprising a chamber having two legs 5ª and 5ᵇ which communicate with one another at their lower ends, the communication being formed by means of a passage 6. The upper end of each of these legs is suitably connected in the supply pipe line 2 so that the liquid passing therethrough also passes into and down the inlet legs 5ª, through the passage 6 and then up and out the outlet leg 5ᵇ. With this arrangement it will be seen that when the liquid level in the supply tank 1 is above the opening 3, the legs 5ª and 5ᵇ will be constantly filled with liquid while the engine is running. Should the engine be stopped the liquid in the said legs will be trapped and thus held at a high level therein.

It will also be noted that when the liquid level in the supply tank 1 falls below the opening 3, air will be drawn into the pipe line 2 and thus into the inlet leg 5ª of the indicating device. This will cause the liquid level therein to fall below its normal height as the air drawn in will accumulate in the upper part of this chamber.

Any suitable means may be employed to visibly indicate the rise and fall of the liquid in the leg 5ª though the following arrangement is preferable. In the inlet leg 5ª of the chamber is rotatably mounted a disk 7 to which is secured a float 8. The wall of the chamber in front of the disk is provided with light transmitting openings 9 which are formed by leaving clear spaces in a painted glass front 10 which is suitably secured in the wall of the chamber. Spots 11, of contrasting color to that painted on the glass front 10, are painted on the disk 7 and these spots are adapted by means of the float 8 to be brought into register with the light transmitting openings 9 when the liquid level in the leg 5ª drops below its normal position. The balance of the front side of the disk is colored to correspond with the color on the glass front 10 so that only one color will be shown when the float 8 is raised by means of the liquid level rising to its normal position. To ensure the registration of the spots 11 with the openings 9 and to prevent the float coming to rest in an inoperative position I provide the stop 12 adapted to limit the movement of the float in either direction.

The indicator 4 will be mounted on the instrument board 14 of an automobile so that the driver can easily see the spots 11 when the liquid level in the tank 1 drops to its predetermined minimum level. It will be noted that the air inlet opening 3 is very small in comparison with the liquid inlet 2ª so that a sufficient quantity of liquid fuel will be drawn into the supply pipe 2, when the opening 3 is uncovered and the warning given, to enable the automobile to be driven a reasonable distance to obtain more fuel.

When the tank 1 is refilled and the engine is again started the air in the leg 5ª will be drawn through the pipe line 2 and the liquid level in the leg will be raised to its normal position. The float 8 will then be raised to bring the spots on the disk out of register with the light transmitting openings 9. To enable this to be accomplished more quickly I provide the bleed 15 which forms a communication between the upper ends of the legs 5ª and 5ᵇ so that the air in the former will be drawn directly into the pipe line 2 instead of passing around the trap.

What I claim is:—

1. In liquid level indicating apparatus the combination with a supply tank, and a vacuum feed system including a supply pipe communicating with the tank adjacent the bottom thereof, of means adapted to permit air to be drawn into the said pipe when the liquid level in the tank falls below a predetermined minimum; an indicating device including a chamber connected in said pipe having a normally high liquid level; means whereby the liquid level in the chamber falls when air is being drawn into the pipe, one wall of the chamber being provided with a light transmitting opening; a float in the chamber; and an oscillating member secured to the float and provided with a colored spot, the float being adapted to position the spot into and out of register with the said light transmitting opening.

2. A liquid level indicating device comprising a chamber having two legs communicating at their lower ends and having their upper ends adapted to be connected intermediate the ends of a supply pipe of a vacuum feed system which also includes a supply tank, the said pipe communicating with the tank adjacent the bottom thereof and having an opening above the said communication to permit air to be drawn into the pipe when the level of the liquid in the tank falls below a predetermined minimum and means for giving an indication when the said opening is uncovered by the liquid.

3. A liquid level indicating device comprising a chamber having two legs communicating at their lower ends and having their upper ends adapted to be connected intermediate the ends of a supply pipe of a vacuum feed system which also includes a supply tank, the said pipe communicating with the tank adjacent the bottom thereof and having an opening above the said communication to permit air to be drawn into the pipe when the level of the liquid in the tank falls below a predetermined minimum, the inlet leg of the chamber having a transparent portion; and a float in the inlet leg of the chamber adapted to fall from its normal position when the air is admitted to the chamber.

4. A liquid level indicating device comprising a chamber having two legs communicating at their lower ends and having their upper ends adapted to be connected in a supply pipe of a vacuum feed system which also includes a supply tank, the said pipe communicating with the tank adjacent the bottom thereof and having an opening above the said communication to permit air to be drawn into the pipe when the level of the liquid in the tank falls below a predetermined minimum; a bleed between the upper ends of the said two legs whereby the air in the inlet leg will be quickly exhausted therefrom to permit the liquid level in the inlet leg to rise quickly when the liquid level in the tank is again raised above the said opening, and means for indicating the rise and fall of the liquid in the chamber.

5. A liquid level indicating device comprising a chamber having two legs communicating at their lower ends and having their upper ends adapted to be connected in a supply pipe of a vacuum feed system which also includes a supply tank, the said pipe communicating with the tank adjacent the bottom thereof and having an opening above the said communication to permit air to be drawn into the pipe when the level of the liquid in the tank falls below a predetermined minimum, the said opening being smaller than the said communication whereby the vacuum system will draw air and liquid through the legs of the chamber when the opening is uncovered and the liquid level in the inlet leg will be below its normal position; and means for indicating the rise and fall of the liquid in the said inlet leg.

6. A liquid level indicating device comprising a chamber having two legs communicating at their lower ends and having their upper ends adapted to be connected in a supply pipe of a vacuum feed system which also includes a supply tank, the said pipe communicating with the tank adjacent the bottom thereof and having an opening above the said communication to permit air to be drawn into the pipe when the level of the liquid in the tank falls below a predetermined minimum; and means including a float mounted in the inlet leg of the chamber for indicating the rise and fall of the liquid in the inlet leg of the chamber, the said opening being smaller than the said communication whereby the vacuum system will draw air and liquid through the legs of the chamber when the opening is uncovered so that the float will fall but liquid will continue to flow through the chamber.

Signed at Toronto, Canada this 19th day of September 1923.

MAUNSELL B. JACKSON.